United States Patent

Grimmett

[11] Patent Number: 5,977,887
[45] Date of Patent: Nov. 2, 1999

[54] DATA STORAGE APPARATUS

[75] Inventor: Alan Grimmett, Guildford, United Kingdom

[73] Assignee: Nokia Mobile Phones Limited, Espoo, Finland

[21] Appl. No.: 08/056,718

[22] Filed: May 3, 1993

[30] Foreign Application Priority Data

May 9, 1992 [GB] United Kingdom .................... 9210064

[51] Int. Cl.[6] .................................................. H03K 17/94
[52] U.S. Cl. ............................. 341/26; 341/23; 345/168; 364/189; 364/709.12
[58] Field of Search .................................. 341/22, 23, 26; 345/156, 168; 364/188, 189, 709.12, 709.15, 709.16

[56] References Cited

FOREIGN PATENT DOCUMENTS

| | | |
|---|---|---|
| 0206391 | 12/1986 | European Pat. Off. . |
| 0457077 | 11/1991 | European Pat. Off. . |
| 0469546 | 2/1992 | European Pat. Off. . |
| 2030423 | 4/1980 | United Kingdom . |
| 2195867 | 4/1988 | United Kingdom . |

OTHER PUBLICATIONS

European Patent Office, Patent Abstracts of Japan, JP60103760, published Jun. 8, 1985, "Telephone Set" by Kuriyama Takeshi, p. 1/1.

European Patent Office, Patent Abstracts of Japan, JP3180927 published Aug. 6, 1991, "Method For Discriminationg Input Character String" by Nomura Tatsuro, p. 1/1.

Primary Examiner—Thomas D. Lee
Attorney, Agent, or Firm—Perman & Green, LLP

[57] ABSTRACT

A mobile telephone includes a memory (11) in which both a telephone number and an associated name can be stored. The telephone includes a visual display (8) and a keypad (9) with a plurality of keys (9a) each having a number and several (eg three) alphabet characters associated therewith. In a first data entry mode a telephone number may be entered into the memory (11) by pressing the respective numeric keys (9a) once in turn. In a second data entry mode a name may be entered and appended to the telephone number by pressing the relevant key (9a) an appropriate number of times. For each key one key press displays the first letter, two key presses displays the second letter, and three key presses displays the third letter associated with that key. In a data retrieval mode, however, a data item to be searched is entered by pressing only once for each character the respective keys (9a) having the desired character associated therewith. When a match is found between a name stored in the memory (11) and one of the possible combinations of alphabet characters associated with the sequence of keys pressed in the data retrieval mode, the respective name and associated telephone number are shown on the display (8).

4 Claims, 3 Drawing Sheets

DATA STORAGE APPARATUS

BACKGROUND OF THE INVENTION

This invention relates to a data storage apparatus comprising a memory, and a user interface including a display and a keypad having a plurality of keys which can be pressed for entering data into and retrieving data from the memory.

A mobile telephone is an example of a data storage apparatus which is generally designed with only a limited number of keys. However, mobile telephones are generally provided with a telephone number index comprising a memory in which the user may store frequently used telephone numbers together with a respective alpha-tag (i.e. a text data 'label') such as, for example, the name of the subscriber. The user interface must therefore be capable of inputting not only numeric, but also alphabet characters.

In order to minimize the number of keys required it is common practice for at least some of the numeric keys which are normally used for dialing also to have other characters, specifically alphabet characters, associated therewith. For example, nine of the numeric keys (eg keys 1–9) may each have three other characters associated therewith. Thus only nine keys are needed to represent the 26 characters of the English alphabet and one further character, suitably a space character, making 27 characters in total, in addition to the nine numeric characters.

In a numeric data entry mode each of the numeric keys is pressed just once to enter the respective individual digits of a telephone number to be stored. When the full telephone number has been entered, an alphabetic data storage mode is initiated in which the three alphabet characters associated with a particular key may be selected respectively by pressing the key either once, twice or three times.

Similarly, in a data retrieval mode the individual characters of a name or label to be searched are entered by pressing the relevant keys once, twice or three times, as appropriate. When a match is found between a name stored in the memory and the sequence of characters being entered, the full name is shown on the display either simultaneously or intermittently with the associated telephone number also stored in the memory.

A drawback with this known arrangement is that many keystrokes are required for retrieving data from the memory and this can be time-consuming and irritating for the user. Specifically up to three keystrokes may be needed to enter a single character.

SUMMARY OF THE INVENTION

According to the present invention there is provided a data storage apparatus comprising memory means for storing in encoded form a plurality of data items each comprising one or more characters, and a user interface including a display and a keyboard having a plurality of keys each having two or more characters associated therewith, wherein in one data entry mode a first character associated with a key is selected by pressing the respective key once, and a second character associated with a key is selected by pressing the respective key twice, and in a data retrieval mode the individual characters of a data item to be searched are entered by pressing only once for each character the respective keys having the desired character associated therewith, the data storage apparatus being adapted to show on the display a data item stored in encoded form in the memory means which corresponds with one of the possible combinations of characters associated with the sequence of keys pressed in the data retrieval mode.

A data storage apparatus in accordance with the invention has the advantage of reducing the number of keystrokes in the data retrieval mode since the individual characters of a data item to be searched are entered by pressing the respective keys just once. Hence the user is able to search and find data items stored in the memory means more efficiently.

In a preferred embodiment a third character associated with a key may be selected by pressing the respective key three times in the first data entry mode. In the data retrieval mode a key is pressed only once to search for any of the three characters associated with that key.

Suitably the first, second and third characters are different alphabet characters.

In the preferred embodiment each of the multi-character keys also has a numeric character associated therewith. In a further data entry mode the numeric character associated with a key is selected by pressing the respective key once. Thus only nine keys may be used to represent nine numeric characters (e.g. 1–9) and 27 other characters, e.g. 26 alphabet characters and one ASCII character such as a space. Hence in one data entry mode one of the 27 alphabet or ASCII characters may be selected by pressing the relevant key once, twice or three times as appropriate, and in the further data entry mode one of the nine numeric characters may be selected by pressing the relevant key once. This arrangement is particularly suitable in the context of a telephone since the numeric keys normally used for dialing can also be used to represent all the characters of the English alphabet without the need for additional keys.

In a particular embodiment means may be provided for converting each data item into a numeric version wherein the component alphabetic characters of the data item are converted into respective numeric characters according to the correspondence of characters associated with the respective keys. The numeric version of each data item is stored in memory means to facilitate more rapid and efficient searching in the data retrieval mode as discussed in more detail below.

DESCRIPTION OF A PREFERRED EMBODIMENT

An embodiment of the invention will now be described, by way of example, with reference to the accompanying drawings.

Figure 1:
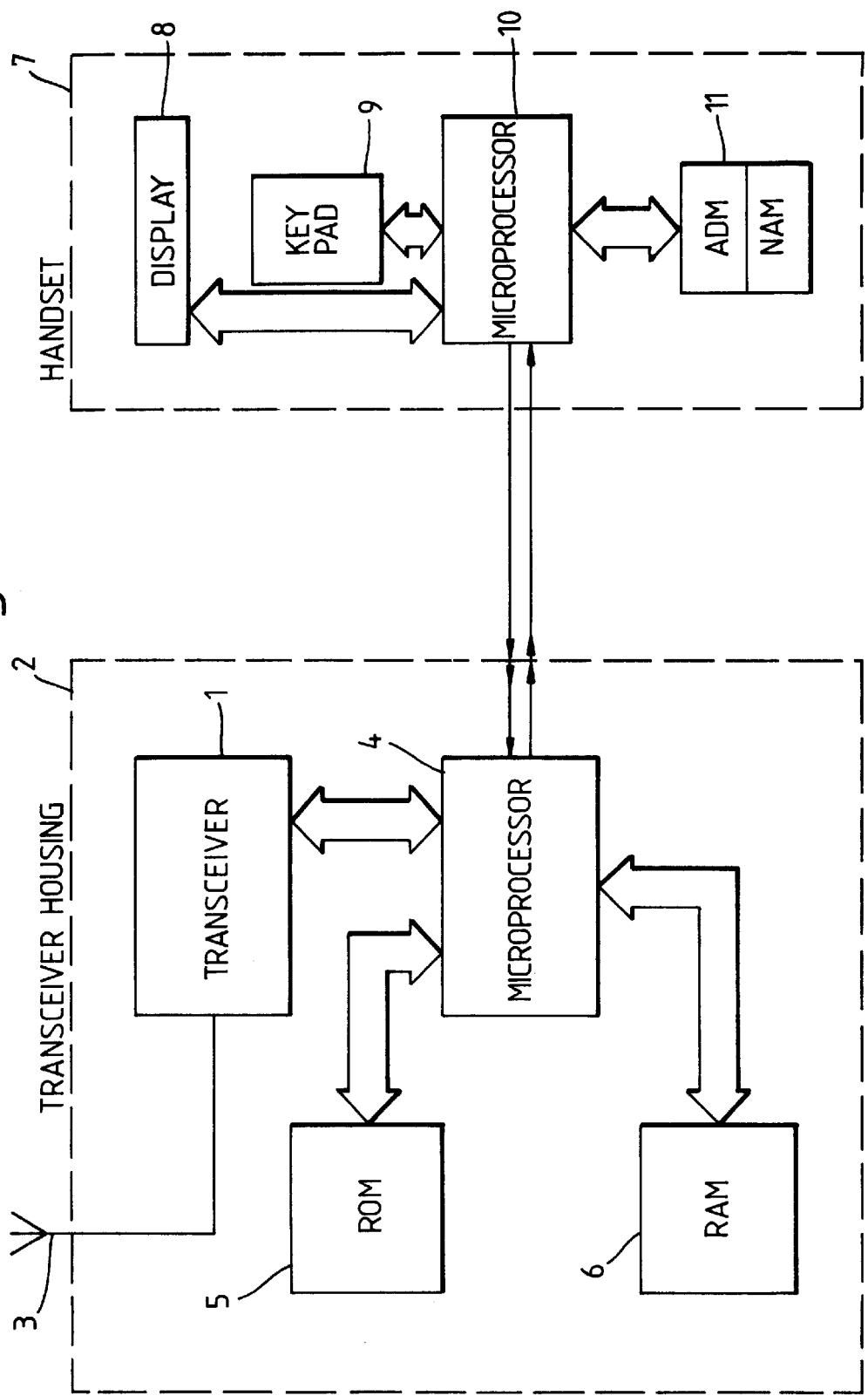
FIG. 1 is a functional block diagram of a mobile telephone in accordance with the present invention.

The telephone apparatus shown in FIG. 1 is a cellular mobile telephone comprising a transceiver 1 and all the other features conventionally found in a cellular telephone. The transceiver is present within a housing 2 and is coupled to an external antenna 3. As is conventional, a microprocessor 4, enclosed within the transceiver housing 2, is employed to control all the basic functions of the telephone. Also enclosed within the housing 2 is a read only memory (ROM) 5 in which is stored the operating software for the telephone and which is coupled to the microprocessor 4; and a random access memory (RAM) 6, also coupled to the microprocessor 4. RAM 6 is used for the temporary storage of data while the telephone is in operation, as described in more detail below.

Figure 2:
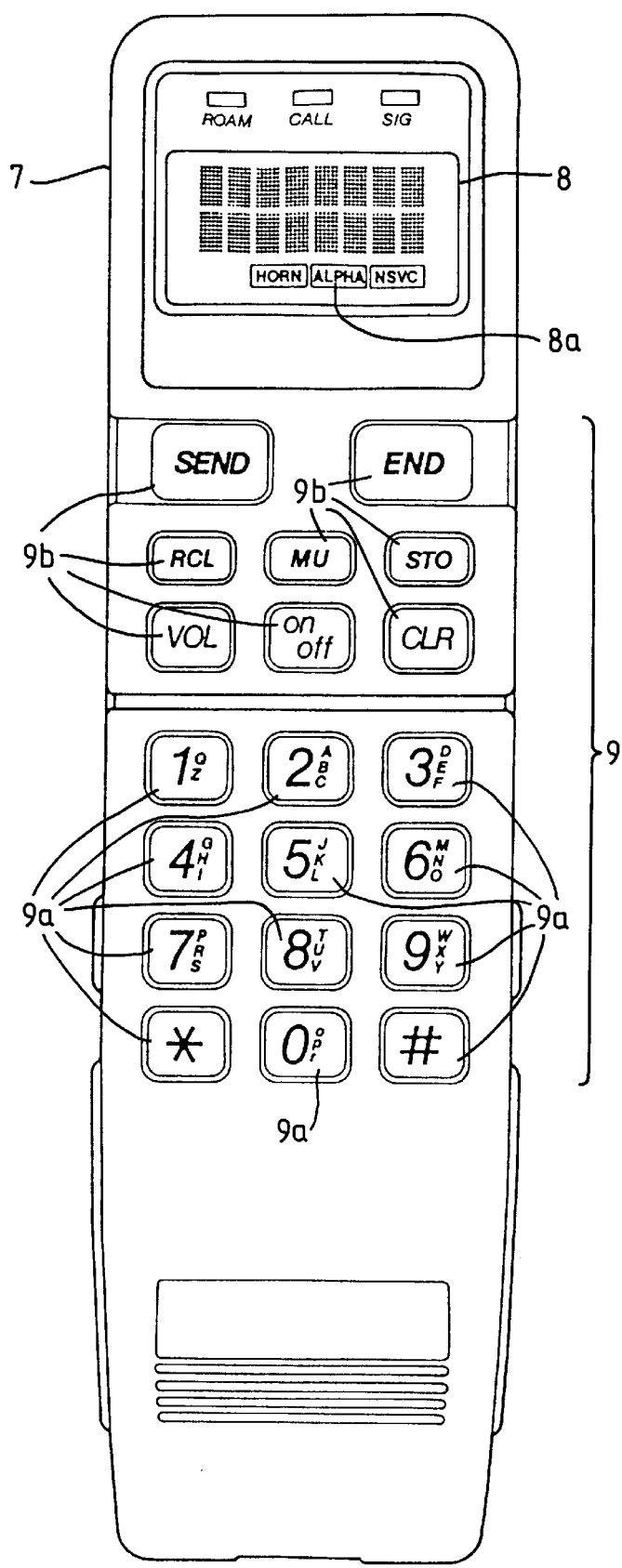
FIG. 2 is a plan view of a handset for the mobile telephone in FIG. 1.

A handset 7 is removably coupled to the transceiver housing in known manner via a conventional curly cord. In addition to a microphone (mouthpiece) and speaker (earpiece) the handset comprises a user interface including a visual display 8 and a keypad 9 coupled to a microprocessor 10 present locally in the handset. The user interface of the handset 7 is shown in more detail in FIG. 2. The visual display comprises for example, a liquid crystal display 8 having two rows of eight characters. Additional indicators such as "ROAM", "CALL", "SIG", illuminated by LEDs may also be provided. The keypad 9 essentially comprises two main sets of keys, namely alphanumeric keys 9a associated with alphanumeric data especially for dialing telephone numbers, but also for entering alphanumeric data into the telephone number store as discussed in more detail below; and a set of function keys 9b for enabling various predetermined functions or operations. The keys 9a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. The keys 9a are also associated with alphabet information, as follows:

The key for number 2 is associated with the alphabet characters A,B,C;
The key for number 3 is associated with the alphabet characters D,E,F;
The key for number 4 is associated with the alphabet characters G,H,I;
The key for number 5 is associated with the alphabet characters J,K,L;
The key for number 6 is associated with the alphabet characters M,N,O;
The key for number 7 is associated with the alphabet characters P,R,S;
The key for number 8 is associated with the alphabet characters T,U,V;
The key for number 9 is associated with the alphabet characters W,X,Y;
The key for number 1 is associated with the alphabet characters Q and Z, and the ASCII "space" character.

The way in which the various characters are selected in different data entry and retrieval modes is discussed below.

As is usual in cellular telephones, the function keys 9b include a "SEND" and "END" key for respectively initiating and terminating a telephone call. Another of the keys 9b is an "ON/OFF" key for turning the telephone on and off. Another of the function keys may be a menu or function key labeled, for example, "MU". Depression of this key enables a variety of pre-set menus, the related instructions of which are stored in memory, to be viewed and selectively enabled. The various menus are selected by depressing the appropriate alphanumeric keys after depressing the "MU" key. The relevant menu is shown to the user in words or abbreviations on the display 8. For example, the user may be able to select an alpha search mode (discussed below) by appropriate menu selection.

Referring back to FIG. 1, an EEPROM 11—also coupled to the handset microprocessor 10—is used for storing both NAM data (e.g. telephone number, system ID, electronic serial number) and abbreviated dialing information (i.e. a telephone number store) as described in more detail below.

When the handset 7 is coupled to the transceiver housing 2 the handset microprocessor 10 is able to communicate with the main microprocessor 4 in the housing 2 via a serial data link. The microprocessor 4 continually monitors the presence of the handset connection. Once it is established that a handset is connected the microprocessor 4 requests the handset to download the NAM data from EEPROM 11 and the NAM data is then transferred into the RAM 6. Thus, while the handset 7 is connected, the transceiver will adopt the identity (telephone number, electronic serial number) of the handset in accordance with our European patent 0,406, 985. This has the advantage that the same transceiver may be used at different times by any number of subscribers having their own handsets programmed with unique NAM data. Each subscriber will be able to receive his own calls and the charges for using the system can be levied to the appropriate subscriber's account.

As mentioned above the EEPROM 11 also includes a telephone number store or abbreviated dialing memory (ADM). The organization of the ADM will now be described with reference to FIG. 3. The telephone number store typically comprises 100 records each consisting of a numeric field 8 bytes long for storing the telephone number, and a text field which suitably is also 8 bytes long. The records are stored respectively at locations 00, 01 . . . 99. It will be understood by a person skilled in the art that up to sixteen decimal digits and up to eight alphabet characters can be stored in an 8-byte field. The telephone numbers are stored right-justified in the "numeric" field (bytes 1 to 8) and filled to the left with "F" (in hexadecimal). In the case of an empty or deleted subscriber number record, the numeric field is filled with F's (hexadecimal). The text is stored left-justified in the text field (bytes 9 to 16) and filled to the right with spaces, ASCII code "20" (hexadecimal). In the case of an empty or deleted record, the text field (bytes 9 to 16) is filled with ASCII code spaces "20" (hexadecimal).

In order to enter a telephone number the respective keys 9a on the handset are pressed once in turn and the selected digits are shown on the visual display 8. If the user wishes to initiate a call to the selected number he then simply presses the "SEND" key 9b in conventional manner. On the other hand if it is desired to store the selected number into the ADM the user presses the store (STO) key 9b. The display 8 will then show the first empty location in the telephone number store, eg: "MEM 10" indicating location 10. If the user presses the "STO" key 9b again the number is stored in location 10. On the other hand if the user wishes to store the number at a particular location he first presses the relevant numeric keys 9a. Thus for example pressing the "1" key, followed by the "5" key, followed by the "STO" key would store the number at location 15. Preferably a message is shown on the display 8 before the "STO" key is pressed for the second time indicating whether the chosen location is empty in order to avoid overwriting data previously stored at the selected location.

When the "STO" key has been pressed for the second time the alphabetic data entry mode is automatically enabled and the "ALPHA" indicator 8a is illuminated on the display 8.

At this stage the alphabet characters, rather than the numeric characters, are entered when the keys 9a are pressed. For each key, one key press displays the first letter, two key presses displays the second letter, and three key presses displays the third letter. So, for example, to enter the name "ROY":

To enter the letter R in the first (left-justified) position:
Press "7"—P is displayed
Press "7"—R is displayed
Press "STO"—R is entered and cursor moves to the second position.
To enter the letter O:
Press "6"—RM is displayed Press "6"—RN is displayed
Press "6"—RO is displayed
Pres "STO"—O is entered in the second position and the cursor moves to the third position.
To enter the letter Y:
Press "9"—ROX is displayed
Press "9"—ROY is displayed
Press "STO"—Y is entered in the third position and the cursor moves to fourth position.

By pressing "STO" again the name "ROY" is stored at the location in association with the telephone number entered at the preceding stage. The alphabetic data entry mode is automatically terminated and the "ALPHA" indicator 8a is accordingly extinguished.

Figure 3:
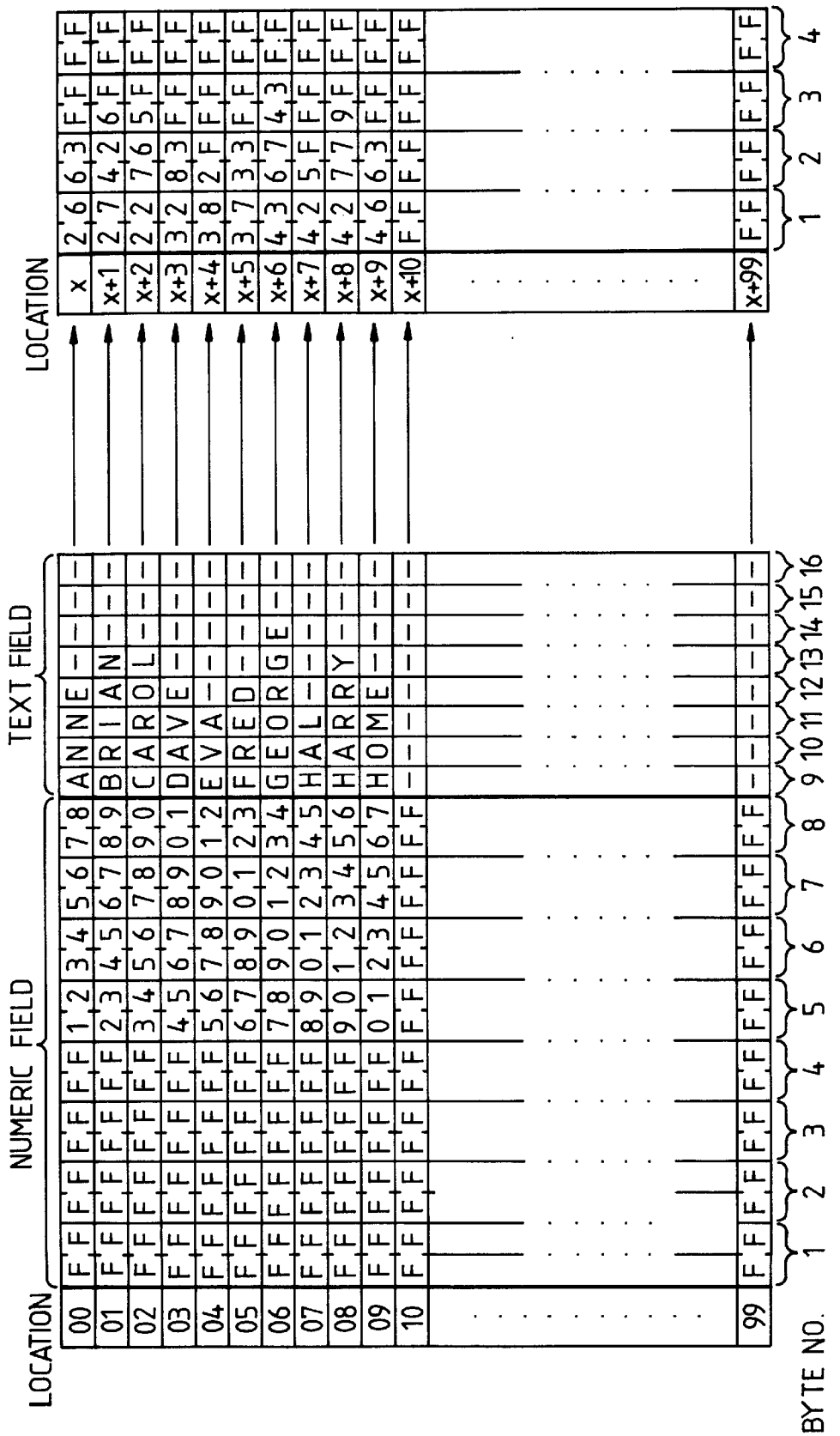
FIG. 3 is a schematic diagram illustrating the storage of data items in the mobile telephone of FIG. 1.

When the handset 7 is connected to the transceiver housing 2 the microprocessor 4 also requests the handset to download data from the telephone number store, ie ADM portion of the EEPROM 11. However only the text field (alphabetic) data is downloaded but this is converted and stored as a numeric version in RAM 6, as follows. Each text field is stored in a correlated location in RAM 6 illustrated in FIG. 3 as an 'offset' of x. Hence data at location y in ADM 11 is stored at location x+y in RAM 6. Each alphabetic character is converted by microprocessor 4 into a numeric character according to the correspondence of characters associated with the respective keys. Thus the characters A,B,C convert to a 2; D,E,F convert to a 3 and so on. As shown in FIG. 3, the name ANNE stored in the text field at ADM location 00 will be converted and stored as 2663 at RAM location x. Similarly the name BRIAN stored in the text field at ADM location 01 will be converted and stored as 27426 at RAM location x+1. Other examples are shown for the first ten locations, in FIG. 3.

In order to recall data stored in the telephone number store portion of the EEPROM 11 an alphabetic data retrieval mode can be initiated by menu selection using the "MU" key 9b. So, for example, the alphabetic data retrieval mode may be accessed by pressing the "MU" key 9b followed by the "0" and "5" keys 9a (assuming that this function is listed at menu location 05). The message "ALPHA SEARCH" is shown on the display 8. Pressing the "MU" key again will initiate the ALPHA search mode. In accordance with the invention the individual characters of a data item to be searched are entered by pressing only once for each character the respective keys having the desired character associated therewith. For example if the user is searching for the name "HARRY" he first presses the "4" key associated with the letter H (see FIG. 2). The data stored in RAM 6 is searched until a first data item is found with a 4 in the first position. Referring to FIG. 3, it will be seen that the first "corresponding" data item is at location x+6, namely 436743 which correlates to the data item GEORGE at location 06 in the ADM 11. This name and telephone number stored at ADM location 06 are then shown on the display 8. The name and number may be displayed simultaneously if the capacity of the display permits, or they may be displayed sequentially. Since the displayed data item is not the item being searched the user proceeds to press the "2" key associated with the letter A. The data stored in RAM 6 is searched until a first data item is found with the digits 42 in the first two positions. Referring to FIG. 3, it will be seen that the first matching data item is at location x+7, namely 425 which correlates to the data item HAL at location 07 in the ADM 11. The name HAL and associated telephone number stored at ADM location 07 are shown on the handset display 8. Again this is not the item being searched and so the "7" key is pressed representing the letter R. The data stored in RAM 6 is again searched and a unique data item is found with the digits 427 in the first three positions. Referring to FIG. 3, it will be seen that the unique matching data item is found at location x+8, namely 42779 which correlates with the data item HARRY at location 08 in the ADM 11. The name HARRY and the associated telephone number stored at ADM location are shown on the handset display 8. The search has thus been completed with only three key presses. The user can now proceed to call the displayed number simply by pressing the "SEND" key 9b.

The applicant has found in practice that most data entries in a 100-location telephone number store can be retrieved with only two or three key strokes. Referring to the example shown in FIG. 3 it can be seen that ANNE will be retrieved after a single keystroke, BRIAN after two keystrokes, CAROL after two keystrokes, DAVE after one keystroke, EVA after two keystrokes, FRED after two keystrokes, HAL after two keystrokes, HARRY after three keystrokes, and HOME after two keystrokes. In this example, the maximum number of keystrokes to search and find a particular data item is only three.

It is noted here that the conversion and storage of the data item text fields in numeric format has the advantage not only that comparison can be made more quickly, but also less storage capacity is required since a numeric digit can be stored in half a byte whereas a whole byte is required to store an alphabet or ASCII character. Hence, in this example only 400 bytes of memory are required to store the data from the telephone number store as a numeric version in RAM 6.

In view of the foregoing description it will be evident to a person skilled in the art that various modifications may be made within the scope of the present invention. For example it is not necessary for the data stored in the text field of the telephone number store to be converted and stored as a numeric version since a direct comparison can be effected between the alphabet characters stored in the telephone number store and the single keystrokes, made during the data retrieval mode. Thus pressing the key 2 during the data retrieval mode may be interpreted as any of the alphabet characters A, B, or C and likewise for the other keys. Moreover, it may be arranged that in the alpha search mode all the possible "matching" data items found at each keystroke may be displayed automatically in sequence, for example at one second intervals. Furthermore, to enhance the searching efficiency, as each key is pressed in the data search mode any ADM location not fulfilling the match may be flagged as "BAD" and the flagged locations may then be ignored during the rest of the current search sequence.

Finally it is noted that the present invention may be applied in other kinds of telephone, for example portable radio telephones or conventional cord-line telephones which include an alphabetic storage facility, or indeed in any other data storage apparatus having multi-character keys.

The scope of the present disclosure includes any novel feature or any novel combination of features disclosed therein either explicitly or implicitly or any generalisation thereof irrespective of whether or not it relates to the claimed invention or mitigates any or all of the problems addressed by the present invention. The applicant hereby gives notice that new claime may be formulated to such features during the prosecution of the present application or of any such further application derived therefrom.

What we claim is:

1. Data storage apparatus, comprising:
   memory means for storing in encoded form a plurality of data items each comprising one or more characters,
   a user interface including a display and a keyboard having a plurality of keys, each key having two or more characters associated therewith, wherein in one data entry mode a first character associated with one of the keys is selected by pressing the respective key once, and a second character associated with the key is selected by pressing the respective key twice, said first and second characters being alphabet characters, each of said keys additionally having a numeric character associated therewith and, in a further data entry mode, the numeric character associated with one of the keys is selected by pressing the respective key once, and in a data retrieval mode the individual characters of a data item to be searched are entered by pressing only once for each character the respective key having the desired character associated therewith, the data storage apparatus being adapted to show on the display a data item stored in encoded form in the memory means which corresponds with one of the possible combinations of characters associated with the sequence of keys pressed in the data retrieval mode, means for converting each data item stored in encoded form in the memory means into a numeric version wherein the component alphabetic characters of the data item are converted into respective numeric characters according to the correspondence of numeric and alphabetic characters associated with the respective keys, and means for storing the numeric version of each data item.

2. Data storage apparatus, comprising:

memory means for storing in encoded form a plurality of data items each comprising one or more characters, a user interface including a display and a keyboard having a plurality of keys, each key having two or more characters associated therewith, wherein in one data entry mode a first character associated with one of the keys is selected by pressing the respective key once, a second character associated with the respective key is selected by pressing the respective key twice, and a third character associated with the respective key is selected by pressing the respective key three times, and in a data retrieval mode the individual characters of a data item to be searched are entered by pressing only once, for each characters the respective key having the desired character associated therewith, the data storage apparatus being adapted to show on the display a data item stored in encoded form in the memory means which corresponds with one of the possible combinations of characters associated with the sequence of keys pressed in the data retrieval mode, means for converting each data item stored in encoded form in the memory means into a numeric version wherein the component alphabetic characters of the data item are converted into respective numeric characters according to the correspondence of numeric and alphabetic characters associated with the respective keys, and means for storing the numeric version of each data item.

3. A data storage apparatus as claimed in claim 2, wherein said first, second and third characters are alphabet characters.

4. A data storage apparatus as claimed in claim 3, each of said keys additionally having a numeric character associated therewith, wherein in a further data entry mode the numeric character associated with a key is selected by pressing the respective key once.

* * * * *

EX PARTE REEXAMINATION CERTIFICATE (9155th)
United States Patent
Grimmett

(10) Number: US 5,977,887 C1
(45) Certificate Issued: Jul. 31, 2012

(54) DATA STORAGE APPARATUS

(75) Inventor: Alan Grimmett, Guildford (GB)

(73) Assignee: Mobilemedia Ideas LLC, Chevy Chase, MD (US)

Reexamination Request:
No. 90/012,083, Jan. 9, 2012

Reexamination Certificate for:
Patent No.: 5,977,887
Issued: Nov. 2, 1999
Appl. No.: 08/056,718
Filed: May 3, 1993

(30) Foreign Application Priority Data

May 9, 1992 (GB) ............................................. 9210064

(51) Int. Cl.
*H03K 17/94* (2006.01)

(52) U.S. Cl. ............................. 341/26; 341/23; 345/168; 700/84; 708/142

(58) Field of Classification Search .......................... None
See application file for complete search history.

(56) References Cited

To view the complete listing of prior art documents cited during the proceeding for Reexamination Control Number 90/012,083, please refer to the USPTO's public Patent Application Information Retrieval (PAIR) system under the Display References tab.

*Primary Examiner* — Salman Ahmed

(57) ABSTRACT

A mobile telephone includes a memory (11) in which both a telephone number and an associated name can be stored. The telephone includes a visual display (8) and a keypad (9) with a plurality of keys (9a) each having a number and several (eg three) alphabet characters associated therewith. In a first data entry mode a telephone number may be entered into the memory (11) by pressing the respective numeric keys (9a) once in turn. In a second data entry mode a name may be entered and appended to the telephone number by pressing the relevant key (9a) an appropriate number of times. For each key one key press displays the first letter, two key presses displays the second letter, and three key presses displays the third letter associated with that key. In a data retrieval mode, however, a data item to be searched is entered by pressing only once for each character the respective keys (9a) having the desired character associated therewith. When a match is found between a name stored in the memory (11) and one of the possible combinations of alphabet characters associated with the sequence of keys pressed in the data retrieval mode, the respective name and associated telephone number are shown on the display (8).

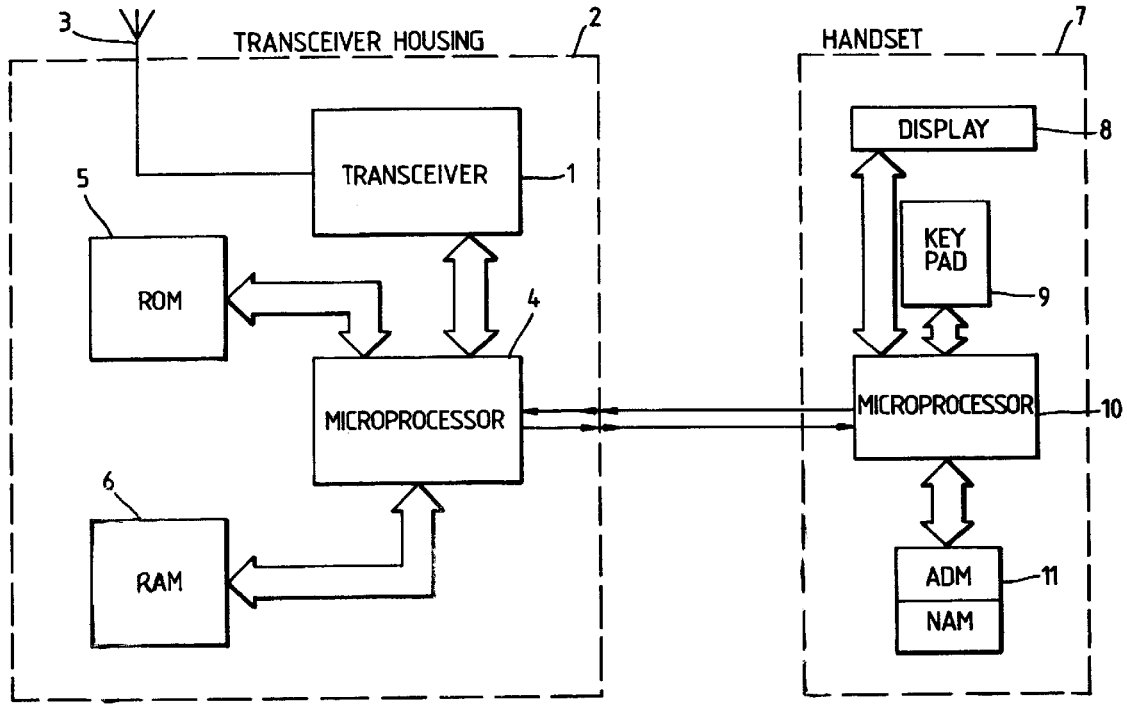

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

New claims 5-32 are added and determined to be patentable.

*5. The data storage apparatus as claimed in claim 1, wherein the data storage apparatus is a cellular mobile telephone.*

*6. The data storage apparatus as claimed in claim 5 further comprising a transceiver.*

*7. The data storage apparatus as claimed in claim 5 further comprising a handset.*

*8. The data storage apparatus as claimed in claim 7 further comprising:*
*a transceiver, a microphone, and a speaker.*

*9. The data storage apparatus as claimed in claim 8 wherein the handset comprises a housing containing at least the user interface, the microphone and the speaker.*

*10. The data storage apparatus as claimed in claim 5 further comprising a key enabling one or more preset menus to be viewed and selectively enabled.*

*11. The data storage apparatus as claimed in claim 10 further comprising a key for initiating a call.*

*12. The data storage apparatus as claimed in claim 10 further comprising a key for terminating a call.*

*13. The data storage apparatus as claimed in claim 1, wherein the data storage apparatus comprises a handset coupled to a transceiver housing comprising a transceiver and an antenna coupled to the transceiver.*

*14. The data storage apparatus as claimed in claim 1 further comprising a transceiver.*

*15. The data storage apparatus as claimed in claim 1 wherein the means for converting is also for downloading the plurality of data items from the memory means, and wherein the means for converting converts each downloaded data item.*

*16. The data storage apparatus as claimed in claim 1, wherein the numeric version of each data item is stored in a memory separate from a memory that initially stores the plurality of data items in encoded form.*

*17. The data storage apparatus as claimed in claim 1, wherein the numeric version of each data item is stored at a correlated memory location, the correlated memory location being equal to an offset plus a first memory location at which the data item is initially stored in memory.*

*18. A data storage apparatus as claimed in claim 1, wherein said memory means for storing is for storing an ASCII code said plurality of data items.*

*19. The data storage apparatus as claimed in claim 2, wherein the data storage apparatus is a cellular mobile telephone.*

*20. The data storage apparatus as claimed in claim 19 further comprising a transceiver.*

*21. The data storage apparatus as claimed in claim 19 further comprising a handset.*

*22. The data apparatus as claimed in claim 21 further comprising:*
*a transceiver, a microphone, and a speaker.*

*23. The data storage apparatus as claimed in claim 22 wherein the handset comprises a housing containing at least the user interface, the microphone and the speaker.*

*24. The data storage apparatus as claimed in claim 19 further comprising a key for enabling one or more preset menus to be viewed and selectively enabled.*

*25. The data storage apparatus as claimed in claim 24 further comprising a key for initiating a call.*

*26. The data storage apparatus as claimed in claim 24 further comprising a key for terminating a call.*

*27. The data storage apparatus as claimed in claim 2, wherein the data storage apparatus comprises a handset coupled to a transceiver housing comprising a transceiver and an antenna coupled to the transceiver.*

*28. The data storage apparatus as claimed in claim 2 further comprising a transceiver.*

*29. The data storage apparatus as claimed in claim 2 wherein the means for converting is also for downloading the plurality of data items from the memory means, and wherein the means for converting converts each downloaded data item.*

*30. The data apparatus as claimed in claim 2, wherein the numeric version of each data item is stored in a memory separate from a memory that initially stores the plurality of data items in encoded form.*

*31. The data storage apparatus as claimed in claim 2, wherein the numeric version of each data item is stored at a correlated memory location, the correlated memory location being equal to an offset plus a first memory location at which the data item is initially stored in memory.*

*32. A data storage apparatus as claimed in claim 2, wherein said memory means for storing is for storing in ASCII code said plurality of data items.*

\* \* \* \* \*